(12) United States Patent
Burckart et al.

(10) Patent No.: US 7,472,195 B2
(45) Date of Patent: Dec. 30, 2008

(54) UNOBTRUSIVE PORT AND PROTOCOL SHARING AMONG SERVER PROCESSES

(75) Inventors: Erik J. Burckart, Raleigh, NC (US); Stephen M. Fontes, Morrisville, NC (US); Robert H. High, Round Rock, TX (US); Craig A. Lanzen, LambertVille, MI (US); William T. Newport, Rochester, MN (US); James L. Van Oosten, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 10/717,007

(22) Filed: Nov. 19, 2003

(65) Prior Publication Data

US 2005/0108723 A1  May 19, 2005

(51) Int. Cl.
*G06F 15/16* (2006.01)
(52) U.S. Cl. .................. 709/228; 709/230; 719/313; 719/320
(58) Field of Classification Search .......... 719/310, 719/313, 315, 320; 709/225, 230, 234, 200, 709/203, 227, 228; 370/466
See application file for complete search history.

(56) References Cited

U.S. PATENT DOCUMENTS

| | | | | |
|---|---|---|---|---|
| 5,257,369 | A * | 10/1993 | Skeen et al. | 719/312 |
| 5,469,545 | A * | 11/1995 | Vanbuskirk et al. | 709/234 |
| 5,966,531 | A * | 10/1999 | Skeen et al. | 719/315 |
| 6,134,244 | A | 10/2000 | Van Renesse et al. | |
| 6,189,025 | B1 | 2/2001 | Ogura et al. | |
| 6,363,081 | B1 * | 3/2002 | Gase | 370/466 |
| 6,539,030 | B1 | 3/2003 | Bender et al. | |
| 6,738,815 | B1 * | 5/2004 | Willis et al. | 709/225 |
| 2001/0016880 | A1 | 8/2001 | Cai et al. | |
| 2002/0097747 | A1 | 7/2002 | Kirkby et al. | |
| 2003/0028681 | A1 | 2/2003 | Jain et al. | |
| 2003/0154284 | A1 | 8/2003 | Bernardin et al. | |

(Continued)

OTHER PUBLICATIONS

*Designing Manageable Protocols*, In *proceedings of Terena Networking Conference*, May 19-22, 2003. (visited Nov. 3, 2003) <http://www.terena.nl/conferences/tnc2003/>.

(Continued)

*Primary Examiner*—Van H Nguyen
(74) *Attorney, Agent, or Firm*—A. Bruce Clay, Esq.; Steven M. Greenberg, Esq.; Carey Rodriguez Greenberg & Paul LLP

(57) ABSTRACT

In a hierarchy of layered applications and corresponding protocols, a port and protocol sharing method is disclosed. Traffic is received over a single shared logical port, and the traffic is routed to an interlayer communications process disposed between two layers in the hierarchy. A discrimination algorithm is applied to select a particular application/protocol layer in a higher one of the two layers to which the traffic is to be routed. The traffic is routed to the selected particular application/protocol layer. An additional application/protocol layer is added to the hierarchy. The discrimination algorithm is replaced with another discrimination algorithm program to consider the additional application/protocol layer during the selection process. The additional application/protocol layer is considered in the selecting step. When selected, the traffic is routed to the additional application/protocol layer. The adding and replacing steps are performed without decoupling or disabling other applications and protocols in the hierarchy.

14 Claims, 3 Drawing Sheets

U.S. PATENT DOCUMENTS

2003/0161268 A1    8/2003    Larsson et al.

OTHER PUBLICATIONS

O'Ryan, Carlos et al., The *Design and Performance of a Pluggable Protocols Framework for Real-time Distributed Object Computing Middleware.*, {coryan,fredk,schimdt,othman,parsons}@cs.wustl.edu, Department of Computer Science, Washington University, St. Louis, MO 63130, USA.

Schantz, Dr. Richard E., *Quorum Distributed Object Integration (QuOIN) Final Report* Jul. 29, 2002.

\* cited by examiner

UNOBTRUSIVE PORT AND PROTOCOL SHARING AMONG SERVER PROCESSES

BACKGROUND OF THE INVENTION

1. Statement of the Technical Field

The present invention relates to the field of inter-process and intra-process communications, and more particularly to port and protocol sharing among multiple server processes.

2. Description of the Related Art

Inter-process and intra-process communications relates to the exchange of electronic data between two or more computing processes, or within a single computing process, in a computer communications network. Traditionally, inter-process and intra-process communications in the context of the Internet protocol involves the addressing of information for delivery to a computing process at a specific network address using a specific port therein. In this regard, the combination of the address and port, referred to as a socket, can form the basis of sockets based communications. To effectively deploy a server based computing process, then, an address and port for the server based computing process first must be established for the benefit of client computing processes accessing the server computing process.

Most computing server processes provide access thereto through a published or conventionally established port. For instance, hypertext transfer protocol (HTTP) data messages typically can be processed through port 80 of a server process, or occasionally, port 8080. By comparison, the file transfer protocol (FTP) can operate through port 21. Both cases illustrate the principle that common Internet services use well-known ports because most applications, particularly Internet services, do not know how many logical ports within a host platform will be available at any one moment and how those logical ports may be configured. Accordingly, rather than forcing a server process to change its configuration to accommodate a new application, the applications typically use well known ports that are supported by all server processes.

Because server processes use well-known ports, server processes may be limited to providing a single Internet service within a single host. This limitation can be logical result of the requirement that the server process monitor the configured port for requests and responses directed to the server process. Typically, all messages received over the monitored port are deemed to have been directed to the server process. Thus, where multiple server processes "listen on" the same port, confusion can result and substantial logic and a proprietary configuration will be required to overcome this naturally arising confusion. Additionally, where a firewall has been deployed, oftentimes only a few select ports are open for communications by default.

United States Patent Application Publication No US 2003/0028681 A1 by Jain et al., hereinafter the "Jain publication", which has been commonly assigned to International Business Machines Corporation, addresses the deficiencies of the assignment of a port to a single server process. In the Jain publication, it is proposed that multiple processes can share a single port by virtue of a shared port mapping layer. The shared port mapping layer can act as an intermediate "traffic cop". Incoming traffic on the shared port can be resolved to back end specific ports through a mapping of the domain name associated with the incoming traffic to the back end specific port. In this way, though the host may be limited in its exposure of logical ports to external client processes, multiple server processes can listen on non-traditional, unused ports without requiring the exposure of those non-traditional ports. Moreover, client processes can continue to rely upon the traditional association of particular server process types with specific, well-known ports.

Despite the advancement demonstrated within the Jain publication, a level of extensibility preferred in the art can be lacking therein. Specifically, to add new server processes to the list of server processes sharing a particular port will require a disruptive modification to the mapping table itself. Moreover, as the mapping relates specifically to the domain of the server process, the port sharing technology of the Jain publication does not account for applications which conform to a layered architecture, rather than a mononlithic architecture. Layered applications reflect the deconstruction of a monolithic application into interdependent layers. Data flowing between the layers can be variably and selectably routed to different layers in the hierarchy. Consequently, a tremendous run-time flexibility can result including a flexibility to distribute the application across different threads and process address spaces.

SUMMARY OF THE INVENTION

The present invention addresses the deficiencies of the art in respect to port sharing among multiple server processes and provides a novel and non-obvious method, system and apparatus for unobtrusive port and protocol sharing among multiple server processes—particularly those server processes coded according to a layered architecture. In accordance with the present invention, a system for port and protocol sharing can include a layered hierarchy of application processes and protocols, an interlayer communications process disposed between each layer in the layered hierarchy, and, a communications layer programmed to moderate access by all of the application processes and protocols in the layered hierarchy to a single logical port. Notably, the communications layer can include a process programmed to map incoming traffic in the single logical port to selected ones of the application process and protocols.

Each interlayer communications process can include a list of application process and protocols coupled to the interlayer communications process at a next higher level in the hierarchy. Each interlayer communication process also can include at least one discrimination process programmed to select a particular one of the application process and protocols in the list to which to route selected incoming traffic. In this regard, the discrimination process can include at least one selectable discrimination algorithm based upon at least one attribute associated with at least one of the application processes and protocols. More particularly, the discrimination algorithm can include a pluggable discrimination algorithm.

In a hierarchy of layered applications and corresponding protocols, a port and protocol sharing method can include receiving traffic over a single shared logical port and routing the traffic to an interlayer communications process disposed between two layers in the hierarchy. A particular application/protocol layer in a higher one of the two layers can be selected to which the traffic is to be routed. Consequently, the traffic can be routed to the selected particular application/protocol layer. Notably, once routed, a subsequent application/protocol layer in a higher one of two other layers can be further selected to which the traffic is to be routed. Consequently, the traffic can be routed to the further selected particular application/protocol layer.

Importantly, an additional application/protocol layer can be added to the hierarchy. Once added, the new application/protocol layer can be considered the in the selecting step. Furthermore, once selected, traffic can be routed to the additional application/protocol layer. Importantly, the selecting step can include the step of selecting a particular application/protocol layer based upon at least one attribute of the particular application/protocol layer. The attribute can include, but is not limited to a number of layers of application processes and protocols disposed within the hierarchy above the interlayer communications process, a weighting of the application processes and protocols; a catch-all to handle individual ones of the applications and protocols which are not selective in nature, previous context characteristics for the applications and protocols, and overall system characteristics.

In a preferred aspect of the present invention, a method for augmenting a hierarchy of layered applications and corresponding protocols can include applying a discrimination algorithm to a selection process in which a particular application/protocol layer in a listing of adjacent application/protocol layers is selected to receive traffic flowing through the hierarchy. A new application/protocol layer can be inserted adjacent to the particular application/protocol layer in the hierarchy. Also, the new application/protocol layer can be added to the listing. Finally, the discrimination algorithm can be replaced with another discrimination algorithm programmed to consider the new application/protocol layer during the selection process. Significantly, each of the steps of performing the inserting, adding and replacing steps can be performed without decoupling or disabling other applications and protocols in the hierarchy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for port and protocol sharing. In accordance with the present invention an inter-process communications structure can be layered about a single logical port. The single logical port can be shared by multiple server processes by way of a communications layer configured to map incoming requests to an intended server process. Importantly, the layered structure can include one or more interlayer communications processes programmed to route data from a source layer to one of a selection of destination layers. In this regard, each layer can include a server process or a protocol relied upon by a higher level server process. Notably, two or more server processes can share access to a single protocol at a lower layer in the hierarchy.

Advantageously, new server processes can be added to the layered architecture and coupled to the single port without requiring an interruption in service to already connected server processes. Similarly, new protocols for supporting new server processes also can be added to the layered architecture and coupled ot the single port without requiring an interruption in service to already connected server processes. In both cases, the new server process or protocol can be communicatively linked to an interlayer communications process. Moreover, a pre-existing selection algorithm disposed within the interlayer communications layer can be substituted with a new selection algorithm programmed to account for the newly added server process or protocol.

Figure 1:
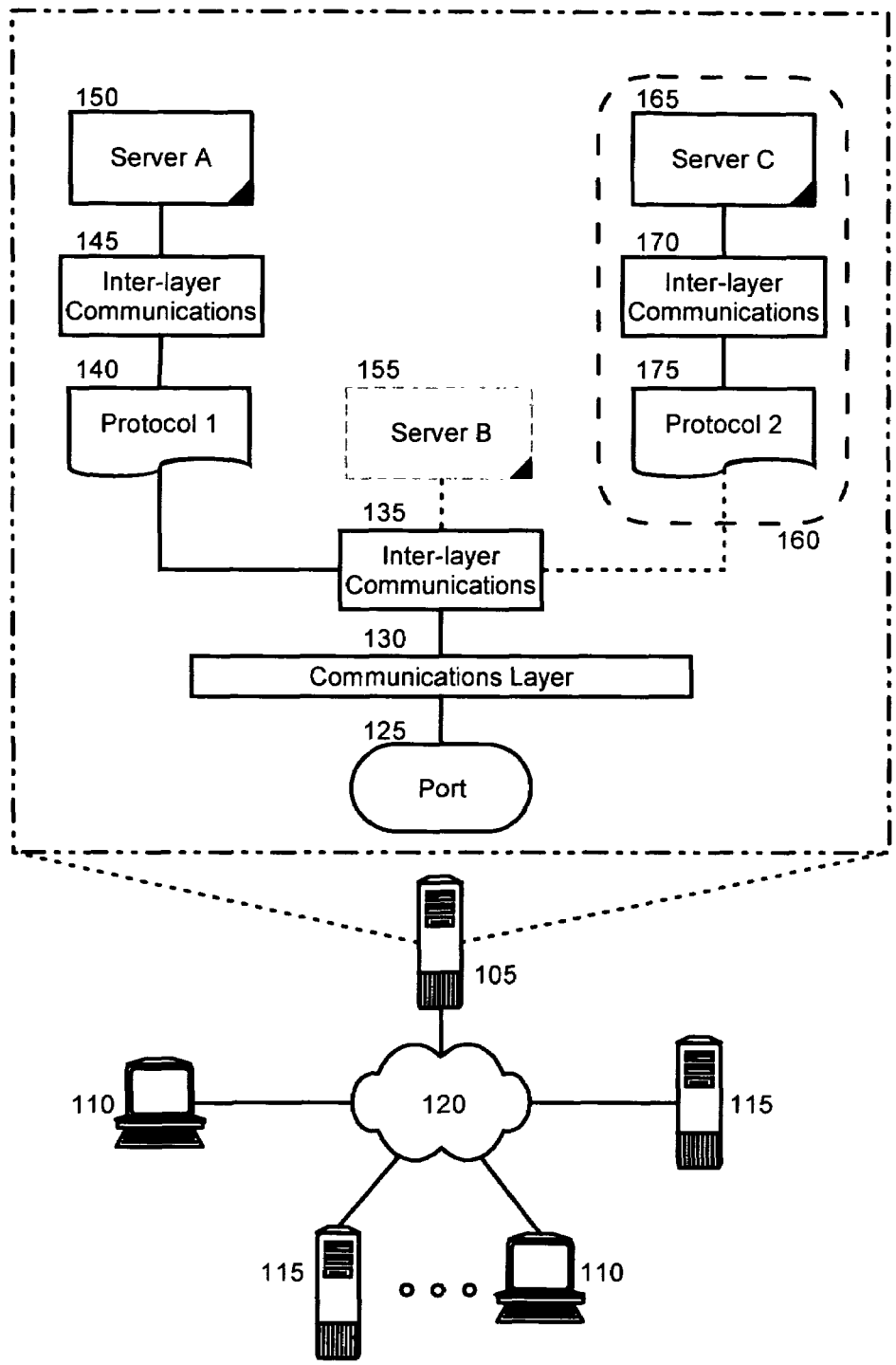
FIG. 1 is a schematic illustration of a host system configured to manage port an protocol sharing among two or more application processes.

FIG. 1 is a schematic illustration of a host system configured to manage port and protocol sharing among two or more application processes. The system can include a physical server or cluster of servers 105 communicatively linked over the computer communications network 120 to one or more client computing devices 110 and other server computing devices 115. Each of the client computing devices 110 and the server computing devices 115 can communicate with the physical server or cluster of servers 105 using well known computer communications techniques such as sockets based communications. Notably, in a preferred aspect of the invention, the communications between the client computing devices 110 and the server computing devices 115 and the physical server or cluster of servers 105 can include request-response type communications typically realized in HTTP communications.\

The physical server or cluster of servers 105 can include a logical port 105 into which data communications from the client computing devices 110 and server computing devices 115 can flow. A communications layer 130 can be communicatively coupled to the port 125 and can listen on the port 125 for incoming traffic. Upon detecting incoming traffic, the communications layer 130 can selectively route the incoming traffic to coupled ones of applications layers such as the protocol layer 140, the server layer 155, and the protocol layer 175 through the operation of the interlayer communications process 135. Specifically, the interlayer communications process 135 can parse the incoming traffic to identify a layer to which to route the traffic. Thus, the interlayer communications process 135 can include layer selection logic (not shown) disposed therein.

It will be recognized by the skilled artisan that a layer as described herein can include a section of programmatic code configured to perform processing responsive to incoming traffic while satisfying the purpose of the traffic. Analogous to an implementation of a communications stack, the combination of layers can perform a composite role, yet the role can be reduced to discrete units of processing to occur in hierarchical form within individual layers. Oftentimes, the layers of an application are suited to the characterization of the processing itself. In this regard, as an example, processing associated with underlying communications functions can be incorporated in the protocol layers 140, 175, while applications functions can be incorporated in the server layers 150, 155, 165. Thus, the server process 150 can be separate from the protocol 140 based upon which the server process 150 can communicate with the client computing devices 110 and server computing devices 115 through the port 125.

In any case, the protocol layers 140 can pass traffic to the server 150 through yet another interlayer communications process 145. Once again, in response to traffic flowing from the protocol layer 140, the interlayer communications process 145 can select a suitable server process 150 to handle the traffic. Where only one server process remains communicatively linked to the interlayer communications process 145, the decision requires little if any analysis. Where additional server processes have been coupled to the protocol layer 140, however, selection logic (not shown) can be applied to select an appropriate one of the server processes.

Importantly, multiple server processes 150, 155, 165 can share access to the port 125 through one or more protocol layers 140, 175. In this regard, port and protocol sharing implies that an unlimited number of unique protocols defined within corresponding protocol layers 140, 175 can share a single listener port 125 in the server 105. Moreover, an unlimited number of server processes 150, 155,165 can share access to a single one of the protocol layers 140,175. For instance, if two server processes utilize the same protocol, for instance HTTP, then both can share that single protocol layer over the single port.

Significantly, new protocol layers can be added to the system shown in FIG. 1 without disabling the operation of existing protocol layers. To that end, each of the interlayer communications processes 135, 145, 170 can include a listing of supported and communicatively coupled server processes and protocols. Each of the interlayer communications processes 135, 145, 170 can further include one or more "discrimination processes" programmed to facilitate the selection of a specific protocol or server for receiving inbound traffic. The discrimination processes (not shown) can include either or both of determinative or probabilistic in nature.

Thus, to add a new server process such as the server process 155, the server process 155 must be listed in the listing of coupled server processes and protocols. Additionally, a new discrimination algorithm must replace a previous discrimination algorithm such that the new server process 155 can be accounted for in processing incoming traffic. Similarly, to add a combination 160 of new server process 165 and new protocol 175, first a new interlayer communications process 170 can be created and coupled to the new server process 165. The new interlayer communications process 170 can be configured with a listing of the sole server process 165 and a discrimination algorithm programmed to route appropriate traffic to the new server process.

Subsequently, a new protocol layer 175 can be created which can support the protocol requirements for the server process 165. The new protocol layer 175 can be coupled both to the interlayer communications process 170 and to the interlayer communications process 135. Consequently, the listing within the interlayer communications process 135 can be modified to include the new protocol layer 175. Moreover, the discrimination algorithm within the interlayer communications process 135 can be replaced with a new discrimination process programmed to route appropriate traffic to the new protocol layer 175. Notably, the foregoing process can be performed without interrupting the operation of the server processes 150, 155.

Figure 2:
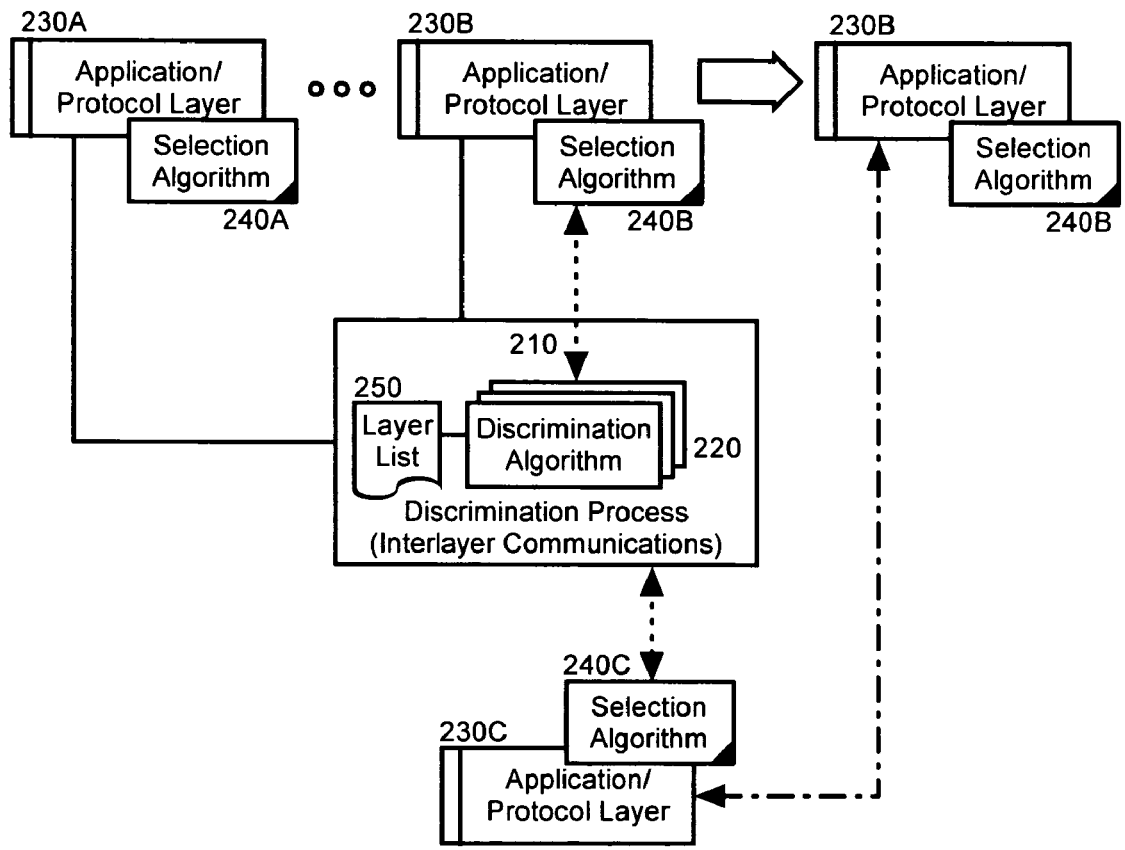
FIG. 2 is a block diagram illustrating an exemplary port and protocol sharing configuration among multiple layered application processes; and, FIG. 3 is a flow chart illustrating a process for port and protocol sharing in the system of FIG. 1.

In further illustration of the foregoing arrangements, FIG. 2 is a block diagram illustrating a configuration of application/protocol layers about the interlayer communications process 175 of FIG. 1. As shown in FIG. 2, a discrimination process 210 can be disposed in the interlayer communications process and can include both a layer list 250 and one or more discrimination algorithms 220. The layer list 250 can specify each application process or protocol 230A, 230B coupled to the discrimination process 210 such that traffic can be routed from the application/protocol layer 230C to one of the application/protocol layers 230A, 230B by way of the discrimination process 210.

In particular, each one of the application/protocol layers 230A, 230B, 230C can be configured with a selection algorithm 240A, 240B, 240C programmed to determine whether to accept a communicative linkage with another one of the application/protocol layers 230A, 230B, 230C. When traffic arrives in the discrimination process 210, the discrimination process can process the traffic in the discrimination algorithms 220 to select a particular one of the application/protocol layers 230A, 230B listed in the layer list 250. Once selected, the lower one of the application/protocol layers 230C can be communicatively linked to the selected one of the application/protocol layers 230B, for example, by contacting the selection algorithm 240B and by joining both layers.

Notably, the discrimination algorithms 220 of the discrimination process 210 can be one or many in number. In all cases, the discrimination algorithms 220 of the discrimination process 210 can be programmed to select the shortest code path for processing traffic in the layered architecture. In this regard, individual ones of the discrimination algorithms 220 can be disposed within the discrimination process 210 to account for multiple attributes of the application/protocol layers 230A, 230B. These attributes can include, for example, the number of layers disposed about the application/protocol layers 230A, 230B within the hierarchy of layers in the layered architecture. Moreover, each of the layers application/protocol layers 230A, 230B can be weighted which can be considered within the discrimination algorithms 220.

One of the discrimination algorithms 220 can be provided as a catch-all to handle the circumstance where an application/protocol layer is not selective in nature (and does not include a corresponding selection algorithm). Previous context characteristics can be considered within the discrimination algorithms 220, such as where a particular thread or connection prefers one of the application/protocol layers 230A, 230B over another. Finally, the overall system characteristics can be considered within the discrimination algorithms 220 such as the observation that one of the application/protocol layers 230A, 230B seems to be selected a majority of times, so the selection algorithm 240A, 240B for the preferred one of the application/protocol layers 230A, 230B ought to be considered first.

Figure 3:
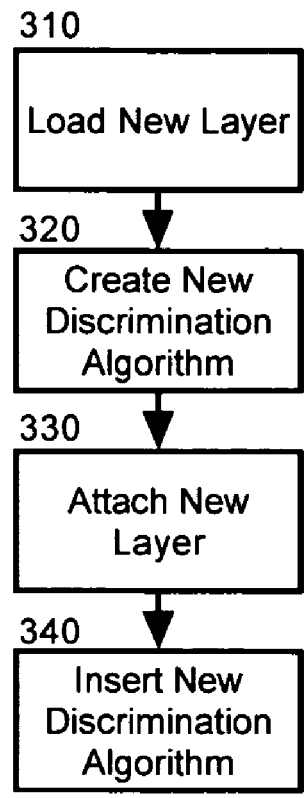

Importantly, to add application/protocol layers to the hierarchy it will be apparent that the discrimination algorithms 220 must be modified to account for the added application/protocol layers as must the layer list 250. In this regard, FIG. 3 is a flow chart illustrating a process for adding a new application/protocol layer to the port and protocol sharing architecture of FIG. 2. Beginning first in block 310, a new application process or protocol layer can be instantiated within an available process address space and a layer within the hierarchy can be selected such that a pertinent interlayer communications process can be identified.

In block 320, the existing discrimination algorithm for the identified interlayer communications process can be retrieved and augmented to include consideration for the added application/protocol layer. In block 330, the new application/protocol layer can be configured for attachment to the interlayer communications process and the layer list of the interlayer communications process can be modified to include a reference to the new application/protocol layer. Finally, in block 340 the augmented discrimination algorithm can be inserted in the discrimination process of the interlayer communications process in lieu of the existing discrimination algorithm. In this way, subsequent traffic can be routed to the new application/protocol layer without having obtrusively interrupted the routing of traffic to the existing application/protocol layers coupled to the interlayer communications process.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for port and protocol sharing comprising:
a processor;
a memory connected to the processor;
a layered hierarchy of application processes and protocols;
an interlayer communications process disposed between each layer in said layered hierarchy; and,
a communications layer programmed to moderate access by all of said application processes and protocols in said layered hierarchy to a single logical port,
wherein each said interlayer communications process comprises:
a list of application process and protocols coupled to said interlayer communications process at a next higher level in said hierarchy; and,
at least one discrimination process programmed to select a particular one of said application processes and protocols in said list to which to route selected incoming traffic, and
wherein said at least one discrimination process comprises at least one selectable discrimination algorithm based upon at least one attribute associated with at least one of said application processes and protocols.

2. The system of claim 1, wherein said communications layer comprises a process programmed to map incoming traffic in said single logical port to selected ones of said application process and protocols.

3. The system of claim 1, wherein said at least one attribute comprises an attribute selected from the group consisting of a number of layers of application processes and protocols disposed within said hierarchy above said interlayer communications process, a weighting of said application processes and protocols in said list;
a catch-all to handle applications and protocols in said list which are not selective in nature, previous context characteristics for said applications and protocols in said list, and overall system characteristics.

4. The system of claim 1, wherein said at least one selectable discrimination algorithm comprises a pluggable discrimination algorithm.

5. In a hierarchy of layered applications and corresponding protocols, a port and protocol sharing method comprising the steps of:
receiving traffic over a single shared logical port and routing said traffic to an interlayer communications process disposed between two layers in the hierarchy;
applying a discrimination algorithm to select a particular application/protocol layer in a higher one of said two layers to which said traffic is to be routed;
routing said traffic to said selected particular application/protocol layer;
adding an additional application/protocol layer to the hierarchy;
replacing said discrimination algorithm with another discrimination algorithm programmed to consider said additional application/protocol layer during said selection process;
considering said additional application/protocol layer in said selecting step;
when selected, routing said traffic to said additional application/protocol layer; and
performing said adding and replacing steps without decoupling or disabling other applications and protocols in the hierarchy.

6. The method of claim 5, further comprising the steps of further selecting a subsequent application/protocol layer in a higher one of two other layers to which said traffic is to be routed; and,
routing said traffic to said further selected particular application/protocol layer.

7. The method of claim 5, wherein said selecting step comprises the step of selecting a particular application/protocol layer based upon at least one attribute of said particular application/protocol layer selected from the group consisting of a number of layers of application processes and protocols disposed within the hierarchy above said interlayer communications process, a weighting of said application processes and protocols;
a catch-all to handle individual ones of said applications and protocols which are not selective in nature, previous context characteristics for said applications and protocols, and overall system characteristics.

8. A computer-implemented method for augmenting a hierarchy of layered applications and corresponding protocols, the method comprising the steps of:
applying a discrimination algorithm to a selection process in which a particular application/protocol layer in a listing of adjacent application/protocol layers is selected to receive traffic flowing through the hierarchy;
inserting a new application/protocol layer adjacent to said particular application/protocol layer in the hierarchy;
adding said new application/protocol layer to said listing;
replacing said discrimination algorithm with another discrimination algorithm programmed to consider said new application/protocol layer during said selection process, and performing said inserting, adding and replacing steps without decoupling or disabling other applications and protocols in the hierarchy.

9. The method of claim 8, wherein said applying step comprises the step of applying said discrimination algorithm to select a particular application/protocol layer based upon at least one attribute of said particular application/protocol layer selected from the group consisting of a number of layers of application processes and protocols disposed within the hierarchy, a weighting of said application processes and protocols;
   a catch-all to handle individual ones of said applications and protocols which are not selective in nature, previous context characteristics for said applications and protocols, and overall system characteristics.

10. A machine readable storage having stored thereon a computer program for port and protocol sharing in a hierarchy of layered applications and corresponding protocols, the computer program comprising a routine set of instructions which when executed by a machine cause the machine to perform the steps of:
   receiving traffic over a single shared logical port and routing said traffic to an interlayer communications process disposed between two layers in the hierarchy;
   applying a discrimination algorithm to a select a particular application/protocol layer in a higher one of said two layers to which said traffic is to be routed;
   routing said traffic to said selected particular application/protocol layer;
   adding an additional application/protocol layer to the hierarchy;
   replacing said discrimination algorithm with another discrimination algorithm programmed to consider said additional application/protocol layer during said selection process;
   considering said additional application/protocol layer in said selecting step;
   when selected, routing said traffic to said additional application/protocol layer; and
   performing said adding and replacing steps without decoupling or disabling other applications and protocols in the hierarchy.

11. The machine readable storage of claim 10, further comprising the steps of further selecting a subsequent application/protocol layer in a higher one of two other layers to which said traffic is to be routed; and,
   routing said traffic to said further selected particular application/protocol layer.

12. The machine readable storage of claim 10, wherein said selecting step comprises the step of selecting a particular application/protocol layer based upon at least one attribute of said particular application/protocol layer selected from the group consisting of a number of layers of application processes and protocols disposed within the hierarchy above said interlayer communications process, a weighting of said application processes and protocols;
   a catch-all to handle individual ones of said applications and protocols which are not selective in nature, previous context characteristics for said applications and protocols, and overall system characteristics.

13. A machine readable storage having stored thereon a computer program for augmenting a hierarchy of layered applications and corresponding protocols, the computer program comprising a routine set of instructions which when executed cause the machine to perform the steps of:
   applying a discrimination algorithm to a selection process in which a particular application/protocol layer in a listing of adjacent application/protocol layers is selected to receive traffic flowing through the hierarchy;
   inserting a new application/protocol layer adjacent to said particular application/protocol layer in the hierarchy;
   adding said new application/protocol layer to said listing;
   replacing said discrimination algorithm with another discrimination algorithm programmed to consider said new application/protocol layer during said selection process, and
   performing said inserting, adding and replacing steps without decoupling or disabling other applications and protocols in the hierarchy.

14. The machine readable storage of claim 13, wherein said applying step comprises the step of applying said discrimination algorithm to select a particular application/protocol layer based upon at least one attribute of said particular application/protocol layer selected from the group consisting of a number of layers of application processes and protocols disposed within the hierarchy, a weighting of said application processes and protocols;
   a catch-all to handle individual ones of said applications and protocols which are not selective in nature, previous context characteristics for said applications and protocols, and overall system characteristics.

\* \* \* \* \*